United States Patent [19]

Bleeke

[11] Patent Number: 5,541,790
[45] Date of Patent: *Jul. 30, 1996

[54] SINGLE POINT MAGNETIC CONTACT LATCH ASSEMBLY

[75] Inventor: William F. Bleeke, Fort Wayne, Ind.

[73] Assignee: Xolox Corporation, Fort Wayne, Ind.

[ * ] Notice: The term of this patent shall not extend beyond the expiration date of Pat. No. 5,343,346.

[21] Appl. No.: 295,237

[22] Filed: Aug. 24, 1994

Related U.S. Application Data

[63] Continuation of Ser. No. 58,479, May 6, 1993, Pat. No. 5,343,346.

[51] Int. Cl.⁶ .............................. G11B 5/54; A44B 1/04; E05C 17/56; H01F 7/20
[52] U.S. Cl. .................. 360/105; 24/303; 292/251.5; 335/117; 335/285
[58] Field of Search .................... 360/97.01–98.01, 360/104–106, 75; 292/251.5, 144, 201; 335/177–179, 285, 304–306; 24/49 M, 303

[56] References Cited

U.S. PATENT DOCUMENTS

| | | | |
|---|---|---|---|
| 2,693,382 | 11/1954 | Teetor | 292/251.5 |
| 2,812,203 | 11/1957 | Scholten | 292/251.5 |
| 2,942,907 | 6/1960 | Nagel et al. | 292/251.5 |
| 3,277,681 | 10/1966 | Bey | 70/457 |
| 3,324,521 | 6/1967 | Humiston | 24/201 |
| 3,369,205 | 2/1968 | Hamrick | 335/177 |
| 3,722,360 | 3/1973 | Blakey et al. | 335/285 |
| 3,875,859 | 4/1975 | Bush | 101/99 |
| 4,078,219 | 3/1978 | Hodgson | 335/167 |
| 4,265,002 | 5/1981 | Hosken | 24/201 B |
| 4,310,188 | 1/1982 | Aoki | 292/251.5 |
| 4,401,960 | 8/1983 | Uchikune et al. | 335/285 |
| 4,505,007 | 3/1985 | Aoki | 24/303 |
| 4,594,627 | 6/1986 | Viskochil et al. | 360/105 |
| 4,660,120 | 4/1987 | Manzke et al. | 360/137 |
| 4,692,829 | 9/1987 | Campbell | 360/105 |
| 4,700,436 | 10/1987 | Morita | 24/303 |
| 4,825,526 | 5/1989 | Shenier et al. | 24/303 |
| 4,881,139 | 11/1989 | Hazebrouck | 360/105 |
| 4,888,655 | 12/1989 | Bonn | 360/97.03 |
| 4,888,656 | 12/1989 | West | 360/106 |
| 4,890,176 | 12/1989 | Casey et al. | 360/105 |
| 4,893,205 | 1/1990 | Hoppe et al. | 360/104 |
| 4,896,231 | 1/1990 | Hoppe | 360/97.02 |
| 4,903,157 | 2/1990 | Malek | 360/105 |
| 4,933,791 | 6/1990 | Cheng | 360/104 |
| 4,941,235 | 7/1990 | Aoki | 24/303 |
| 4,947,274 | 8/1990 | Casey et al. | 360/105 |

(List continued on next page.)

*Primary Examiner*—Jefferson Evans
*Attorney, Agent, or Firm*—Barnes & Thornburg

[57] ABSTRACT

A single-point magnetic contact latch assembly for "parking" a read/write head of a memory storage device over a data-free landing zone during off-power conditions has one or more permanent magnets, a core having a curvilinear shape on one end and an annular flange formed on the opposing end, and a casing, having an open end and a partially closed end, covering the magnet(s). The core is disposed adjacent the magnet(s) and lies within the flux paths thereof. The casing covers the core and magnet(s) so that the curvilinear end of the core extends through the partially open end of the casing. The casing abuts an outer periphery surface of the flange with a press-fit so that the casing is outwardly radially deformed at the point of abutment securely anchoring the casing, and magnet(s) in position relative to the core. The single-point magnetic contact latch assembly is mounted to a crash stop of the memory storage device and engages a ferromagnetic portion of an actuator assembly used to position the read/write head along the storage device during off-power conditions, the latch assembly locating the read/write head over the landing zone to prevent damage to the memory storage device and the read/write head caused by physical contact between the two. An alternative embodiment of the magnetic latch assembly has a substantially spherically shaped core that also provides a single-point magnetic contact between the core and the actuation assembly.

9 Claims, 4 Drawing Sheets

U.S. PATENT DOCUMENTS

| | | | |
|---|---|---|---|
| 4,985,793 | 1/1991 | Anderson | 360/105 |
| 4,989,108 | 1/1991 | Chang | 360/105 |
| 4,995,025 | 2/1991 | Schulze | 369/32 |
| 5,003,422 | 3/1991 | Sun et al. | 360/105 |
| 5,023,736 | 6/1991 | Kelsic et al. | 360/105 |
| 5,025,335 | 6/1991 | Stefansky | 360/97.01 |
| 5,134,608 | 7/1992 | Strickler et al. | 369/215 |
| 5,170,300 | 12/1992 | Stefansky | 360/105 |
| 5,187,267 | 2/1993 | Hickox et al. | 360/105 |
| 5,231,556 | 7/1993 | Blanks | 360/105 |
| 5,262,912 | 11/1993 | Hudson et al. | 360/105 |
| 5,343,346 | 8/1994 | Bleeke | 360/105 |

SINGLE POINT MAGNETIC CONTACT LATCH ASSEMBLY

This is a Continuation of application Ser. No. 08/058,479, filed May 6, 1993, now U.S. Pat. No. 5,343,346.

BACKGROUND AND SUMMARY OF THE INVENTION

The present invention is directed to data storage devices, and particularly to locking mechanisms that hold an actuator assembly in place when power to a data storage device is turned off. More particularly, the present invention is directed to a single point magnetic contact latching assembly for magnetically positioning and parking the read/write head of a disk drive, the movements of which are controlled by an actuator assembly, at a predetermined location above the disk media to prevent damage to both the read/write head and the disk media during off-power conditions. While the following specification, including the Detailed Description of the Drawings, refers to a single read/write head and a single disk, the scope and spirit of the present invention are not limited to such a configuration. Rather, the present invention is suitable for use with any combination of multiple read/write heads and multiple disks.

Disk drives are used as data storage devices for long-term storage of large quantities of data. These devices appear in such forms as magnetic-medium hard drives, magnetic-medium "floppy" diskette drives, and optical CD ROM drives. Both magnetic-medium hard drives and optical CD ROM disks have much greater data storage capabilities than "floppy" diskettes. Although the present invention can be used for both CD ROM and "floppy" diskette drives, its primary intended use is with magnetic-medium hard drives in which a read/write head rests immediately above a disk during off-power conditions.

In magnetic-media hard disk drives, the disk is typically mounted on a rotating spindle that extends through its center. The disk has a large number of annular magnetic "tracks" on the surface thereof that provides a plurality of concentric memory locations for "bits" of data. The read/write head is mounted on an actuator assembly that can move and position the read/write head across the rotating surface of the disk. The read/write head "flies" over the surface of the disk on a cushion of air generated by the rotation of the disk spinning on the spindle. The read/write head is thus in close spaced proximity with the surfaces of the disk but not in contact with the magnetic coating on that surface.

Hard disk drives frequently incorporate a device for "parking" (or latching) the read/write head of the drive over a predetermined location on the disk when the hard disk drive experiences an off-power condition. "Parking" is done to help prevent data loss caused by physical shocks experienced during shipping or other movements of the disk drive during off-power conditions caused by the read/write head striking the surface of the disk. The terms "park" and "parking," as used in this application, refer to maintaining the position of the read/write head over a predetermined location, usually a "landing zone" annulus located on the inside or outside diameter of the disk. This "landing zone" does not have any data stored thereon.

Various types of "parking" (or latching) devices are used to lock the actuator assembly and the read/write head connected thereto in a predetermined position when power is off to the hard disk drive. Some drives utilize a spring-biased pivoting latch arm that holds the actuator assembly in a fixed position under the force of a spring during non-use of the disk. An electromagnet is used to initially lock and release the latch during operation of the disk drive. Other drives utilize air flow generated by the one or more spinning disks to release a spring-biased latch arm. See, for example, Anderson, U.S. Pat. No. 4,985,793, Voice Coil Actuated Disk Drive Parking Device with Magnetic Bias; Malek, U.S. Pat. No. 4,903,157, Electromagnet-Actuated Head Latching Apparatus; and Campbell, U.S. Pat. No. 4,692,829, Magnetically Biased Aerodynamically Released Integral Safety Latch For Rigid Disk Drive.

"Parking" devices that utilize spring-loaded electromagnets or solenoids to release the latch have the disadvantage of using elements such as wire coils that are expensive and difficult to implement because of space and tolerance requirements. In addition, electromagnetic "parking" devices require electrical power to be released during "power-up" of the disk drive. This use of power drains life from batteries of portable computers. Air actuated "parking" devices, on the other hand, have the disadvantage of potentially interfering with the air flow necessary for the read/write head to properly "fly". Also, the air flow in a disk drive only creates a relatively small release force that creates latching reliability problems for "parking" release because only a correspondingly, relatively small latching force can be applied, thus decreasing "parking" integrity.

Another means utilized by disk drives that avoids the problems is purely magnetic "parking" to latch the actuator by magnetic attraction of and direct contact between a ferromagnetic portion of the actuator and a permanent magnet assembly. See, for example, Kelsic et al., U.S. Pat. No. 5,023,736, Magnetic Latch for Disk Drive Actuator; Casey et al., U.S. Pat. No. 4,890,176, Crash Stop and Magnetic Latch for a Voice Coil Actuator; and Casey et al., U.S. Pat. No. 4,947,274, Resiliently Mounted Crash Stop and Magnetic Latch for a Voice Coil Actuator. A potential drawback of magnetic latches is that during operation of the disk drive, the movement of the actuator may be adversely affected by the attraction of the ferromagnetic portion of the actuator and the magnet assembly, thereby creating problems with accurate actuator positioning. Another problem is that a potentially large force may be required to release the actuator assembly from the magnet assembly. Also, when the magnet assembly and ferromagnetic portion of the actuator make contact, portions of the magnet assembly may break off or become dislodged and damage the disk medium. This occurs because the magnets used in the magnet assemblies are generally made from brittle alloys, such as rare earth cobalt, or highly filled polymers that have magnetic particles captured in the matrices thereof. Finally, a potential tolerance problem with multi-point contact magnetic assembly designs exists. If the areas where the contacts are to occur are not precisely aligned, the assembly will not provide the required latch force range. Force ranges due to practical mechanical tolerances often exceed 800% in multi-point designs.

A magnetic "parking" device that avoids the problems associated with conventional magnetic "parking" devices would be a welcome improvement. As long as such device securely latches and locks the actuator assembly in a predetermined position when the power is off to the disk drive, then the opportunity for damage to the data stored on the disk or the read/write head due to physical shocks exerted on the hard disk drive will be kept to a minimum.

Accordingly, the present invention provides a single-point magnetic contact, latch assembly for magnetically engaging a ferromagnetic strike plate portion of an actuator assembly to securely hold the actuator in a fixed position and thus "park" the read/write head in a predetermined location on the disk. A crash stop made of impact absorbing material, such as a resilient plastic, is provided that limits the movement of the actuator assembly in at least one of its directions of travel beyond a predetermined point. The single-point magnetic contact, latch is mounted on the crash stop and magnetically engages the ferromagnetic strike plate on the actuator assembly when the actuator assembly nears one of two extreme positions. This magnetic coupling helps prevent movement of the read/write head away from the "landing zone" on the disk during non-use, so as to protect against damage to the read/write head or data stored on the disk.

The single-point magnetic contact, latch includes a permanent magnet having opposite magnetic poles on opposing ends thereof. In one embodiment, the permanent magnet has a central bore extending axially therethrough. It is to be understood, however, that the permanent magnet may comprise of a plurality of pieces. A solid, ferromagnetic core extends through the bore of the magnet. A first end of the core extends beyond a first end of the magnet and forms the single-point contact which interacts with the actuator. The first end of the core may be substantially curvilinear in shape. The opposing second end of the core has an annular flange with a first face which abuts a second end of the magnet and a second face which abuts a substantially vertical portion of the crash stop to which the latch is mounted. A casing substantially surrounds the magnet. The casing is hollow with an axial length greater than the axial length of the magnet. The casing has an open end and a partially closed end. The partially closed end has an opening therein through which the first end of the core extends. The magnetic latch is assembled by axially disposing the core within the bore of the permanent magnet so that the first face of the flange abuts a second end of the magnet and the first end of the core extends through and beyond the first end of the magnet. The casing is placed over the permanent magnet so that the inner peripheral surface near the edge of the open end of the casing engages an outer peripheral surface of the annular flange with a press-fit so that the casing is outwardly radially deformed. The casing securely anchors the permanent magnet to the core and covers it so that portions thereof are protected from physical contact during handling and operation. This helps prevent portions of the magnet from falling off into the disk drive. This press-fit assembly has the additional advantage of eliminating the use of adhesives to fix the magnet in place. Adhesively mounted magnets suffer from an outgassing problem that can cause damage to components within the sealed disk drive. The magnetic latch assembly is directly press-fit mounted to the crash stop assembly via an integral pin axially extending from the second face of the annular flange.

When the actuator assembly moves towards one of two of its extreme positions, magnetic flux flows from the permanent magnet through the ferromagnetic core, through the ferromagnetic strike plate of the actuator assembly, and then returns to the permanent magnet through the other pole. This flux flow path results because ferromagnetic metal is a superior flux conductor compared to the surrounding air. The magnetic attraction between the magnetic latch assembly and the strike plate of the actuator assembly serves to latch the actuator in a predetermined fixed position and "park" the read/write head over an annularly, concentric, data-free "landing zone" on the disk of the disk drive.

The magnetic coupling force generated by the latch, although sufficient to latch the actuator assembly in position, is easily overcome when the actuator is driven during power-on conditions of the disk drive. Indeed, an object of the invention is to provide a relatively steep fall-off of magnetic-coupling force versus air-gap distance (distance between the single-point, magnetic contact of the core and the ferromagnetic strike plate portion of the actuator assembly) such that the "reach-out" strength of the magnet assembly decreases rapidly as the distance from the contact point increases. When sufficient current flows through an armature of the actuator to overcome the magnetic attraction between the ferromagnetic strike plate of the actuator and the magnetic latch assembly, the actuator will need to move only a short distance to no longer be magnetically linked thereto. This eliminates the potential problem present in other designs in which movement of the actuator assembly during power-on conditions may be affected by attraction between the ferromagnetic portion of the actuator assembly and the magnetic latch assembly.

Other objects of the present invention include prevention of the aforementioned outgassing problem occurring when adhesives are used to retain the magnet. Also, complex and expensive electromagnetic components are eliminated. Finally, the single-point magnetic contact design overcomes force tolerance problems encountered in many conventional magnetic contact assemblies that rely on multiple contact points and one or more strike plates, both of which must be nearly perfectly aligned in order for the assembly to operate correctly and repeatably. That is, the use of a single-point magnetic contact latch assembly provides a smaller tolerance range of latch forces than that of multi-point magnetic contact latch assemblies.

In another embodiment of the present invention, a permanent magnet has opposing magnetic poles on opposing first and second ends thereof and a bore extending axially therethrough between the first and second ends. This magnet may be cylindrical, toroidal, or annular in shape and magnetized in an axial direction. The magnet may be unitary in construction or composed of a plurality of segments that are assembled together to form one of the above-described shapes.

A substantially spherically-shaped ferromagnetic core is disposed within the interior bore of the permanent magnet so that a portion of the core extends beyond the first end of the magnet to form a single-point magnetic contact with a ferromagnetic portion of an actuator assembly such as strike plate. The portion of the core extending beyond the first end of the magnet may be substantially curvilinear in shape.

A mounting structure is provided for mounting the magnetic latch assembly to a disk drive. The mounting structure has a first end that abuts the second end of the permanent magnet. A second end of the mounting structure may have a pin formed thereon for mounting to the disk drive. An edge of the second end of the mounting structure may be beveled to facilitate fixedly attaching the pin to the disk drive.

A casing substantially surrounds the magnet. The casing is hollow with an axial length greater than the axial length of the magnet. The casing has an open end and a partially closed end. The partially closed end has an opening therein through which a portion of the core extends when the casing is press-fit over the magnet, core, and, at least a portion of the mounting structure. The magnet, core, and at least a portion of the mounting structure are disposed within the hollow of the casing so that an air gap exists between the magnet and the casing.

Other objects, advantages and novel features of the present invention will become apparent from the following

DETAILED DESCRIPTION OF THE DRAWINGS

A disk drive including the single-point, curvilinear contact magnetic latch assembly of the present invention will be described with reference to FIGS. 1–10.

Figure 1:
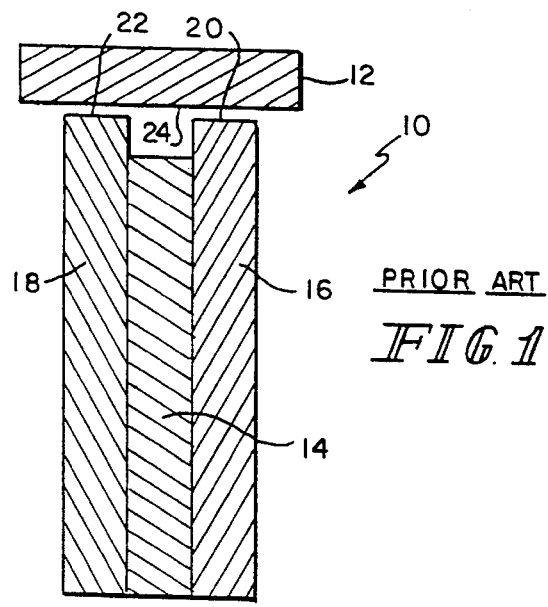
FIG. 1 is a side elevational view of a prior art two-point or surface contact magnetic latch assembly.

FIG. 1 shows a conventional two-point or surface contact magnetic contact latch assembly 10 and a strike plate 12 used in some magnetic latch designs. See, for example, Casey et al., U.S. Pat. No. 4,890,176, Crash Stop and Magnetic Latch for a Voice Coil Actuator and Casey et al., U.S. Pat. No. 4,947,274, Resiliently Mounted Crash Stop and Magnetic Latch for a Voice Coil Actuator. Magnetic latch assembly 10 has a magnet core 14 sandwiched between a first movable plate 16 and a second movable plate 18. Contact between magnetic latch assembly 10 and strike plate 12 is made via abutment of first movable plate end face 20 and second movable plate end face 22 with latch contact face 24. This contact is made via magnetic field flux linkage that could travel from a north pole (not shown) of magnet core 14, through first movable plate 16, through strike plate 12, and through second movable plate 18 back to a south pole (not shown) of the magnet core 14. This flux linkage is what provides the magnetic force that draws in strike plate 12 towards magnetic latch assembly 10 and holds it in abutment therewith.

While the sandwich approach of the magnetic latch assembly 10 provides a steep drop-off in magnetic force as the air gap between strike plate 12 and first and second movable plates 16 and 18 increases, the design requires maintaining two or more surfaces of contact (depending on the number of magnet cores and movable plates) between plates 16 and 18 and strike plate 12. This imposes tight tolerance requirements on the alignment of movable plates 16 and 18, magnet core 14, and strike plate 12. Improper alignment may result in an air gap between a contact surface of movable plates 16 and 18 and the strike plate 12, causing a breaking of the magnetic flux flow path which would manifest itself in insufficient latching force. Also, if one of the plates 16 and 18 "freezes up" so as to prevent contact with strike plate 12, magnetic flux flow will be drastically reduced. Furthermore, because plates 16 and 18 move, wear will occur to both of them and also magnet core 14. This could eventually cause wear particles to be generated which would contaminate a disk drive. The present invention, however, reduces the tolerance requirements and avoids the movement problems of conventional multi-surface contact designs by providing only a single point of contact.

Figure 2:
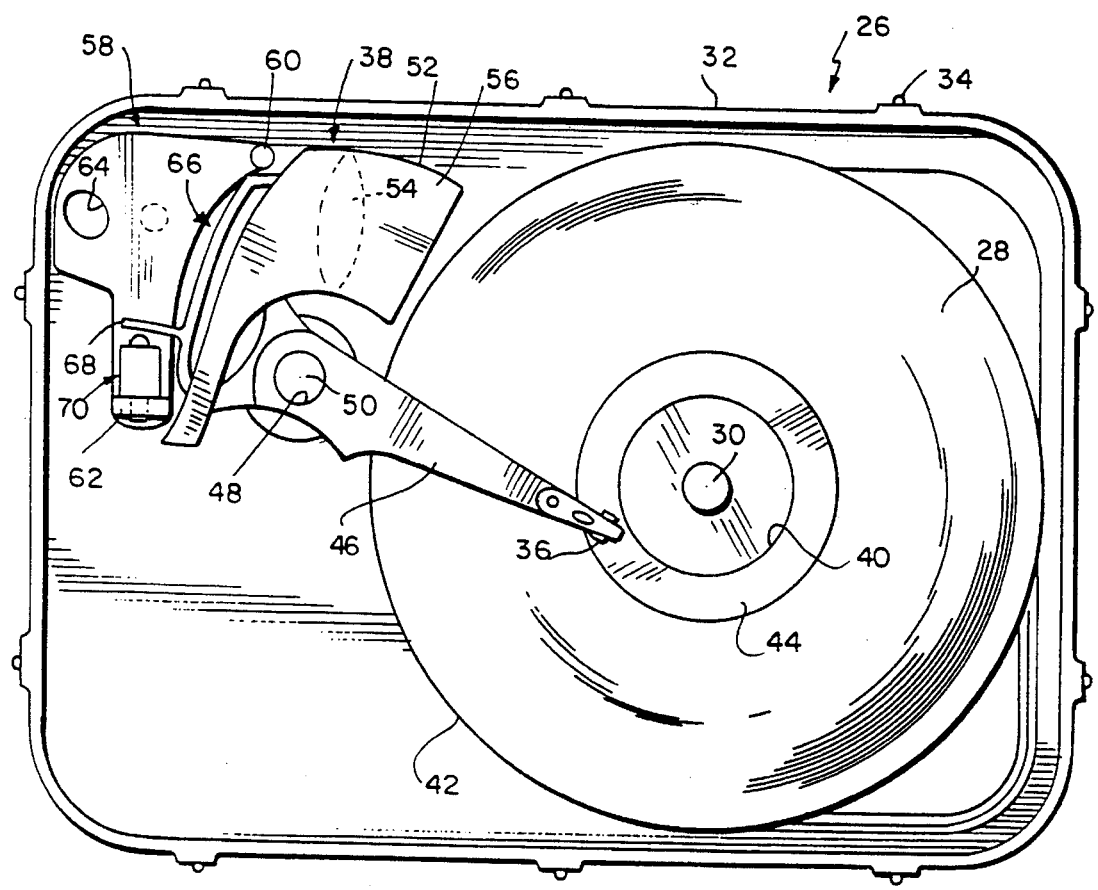
FIG. 2 is a plan view of a disk drive constructed in accordance with the present invention.

A disk drive assembly 26 is shown in FIG. 2. Disk drive assembly 26 includes a spin motor (not shown) connected to disk 28 via a shaft 30 so that the disk 28 is rotated. A base 32 has a plurality of tabs 34 integrally formed thereon that engage via a snap fit with members formed on a cover (not shown) to establish in cooperation with a gasket (not shown) a sealed environment to protect the components therein from ambient atmospheric conditions such as heat, humidity, and airborne contamination. Base 32 also functions as a support for most of the internal components of disk drive assembly 26. Disk drive assembly 26 further includes read/write head 36, and an actuator assembly 38. Disk 28 includes an inside diameter 40, an outside diameter 42, and an annularly shaped information free landing zone 44 for "parking" read/write head 36 thereover during off-power conditions. Landing zone 44 may be at any selected portion of disk drive assembly 26, but a location between the inside and outside diameters 40 and 42 is usually chosen. Actuator assembly 38 includes an actuator arm 46 which has an opening 48 therein through which an armature shaft 50 controlled by armature 52 extends. Current passed through coil assembly 54 covered by a casing 56 creates torque that drives armature shaft 50 so that actuator arm 46 may be pivoted to position read/write head 36 over selected locations on disk 28 between the inside and outside diameters 40 and 42 during power-on conditions, and over landing zone 44 during power-off conditions.

A crash stop 58 made from a resilient impact-absorbing material, such as plastic, includes integrally-formed, upstanding projections 60 and 62 and an opening 64 through which a screw (not shown) extends to secure crash stop 58 to base 32 of disk drive assembly 26. The crash stop 58 is designed to prevent movement of the actuator assembly 38 in both its directions of travel beyond predetermined points.

An arcuately shaped bumper 66 is shown fixedly attached to actuator assembly 38. A ferromagnetic metal strike plate 68 is formed on arcuately shaped bumper 66 which interacts with upstanding projections 60 and 62 to cushion the impact that occurs between crash stop 58 and actuator assembly 38 when the two come into contact. Strike plate 68 magnetically couples with magnetic latch assembly 70, fixedly mounted to projection 62 of crash stop 58, to park read/write head 36 during power-off conditions.

Figure 3:
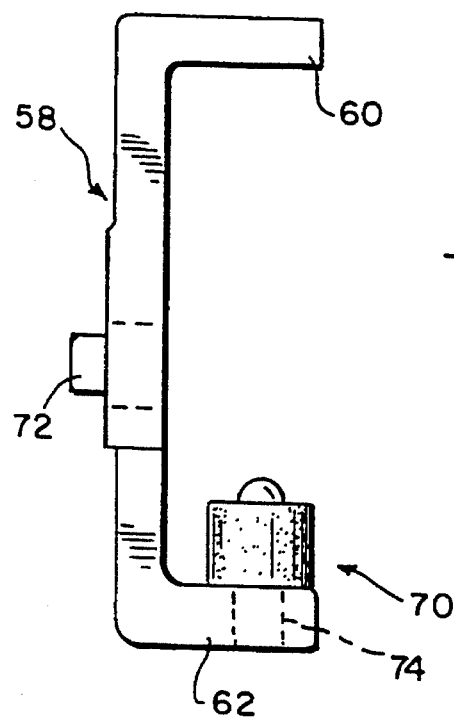
FIG. 3 is a side elevational view of a crash stop having a magnetic latch assembly constructed in accordance with the present invention mounted thereon.

Crash stop 58 and magnetic latch assembly 70 are shown in isolation in FIG. 3. Integrally-formed post 72 for mounting the crash stop 58 to base 32 of disk drive assembly 26 in conjunction with a screw (not shown) through opening 64 (see FIG. 2) is shown as are projections 60 and 62. Projection 62 has a hole formed therein (not shown) for receiving and fixedly securing chamfered pin 74 (shown in dashed lines) of magnetic latch assembly, effectively securing it in position on projection 62. Projection 60 is present to prevent movement of the actuator assembly 38 beyond a predetermined point in the direction of travel away from the magnetic latch assembly 70. This limitation on movement is designed to prevent the actuator arm 46 from positioning the read/write head 36 beyond the outside diameter 42 of disk 28 (see FIG. 2).

At times, the actuator assembly 38 will allow the actuator arm 46 to approach either extreme of the inside diameter 40 or outside diameter 42 of disk 28 at relatively high speeds. Crash stop 58 is formed from a flexible material such as plastic to absorb the energy of impact when strike plate 68 strikes either projection 60 or magnetic latch assembly 70 which is connected to projection 62. This is done to prevent damage to both the data stored on disk 28 and to read/write head 36 that may result from contact between the two.

Figure 4:
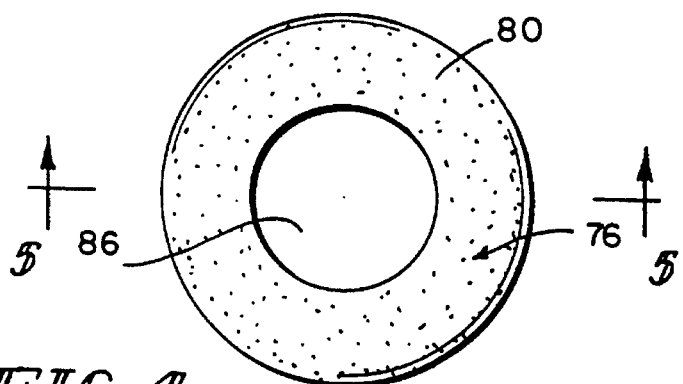
FIG. 4 is a plan view of the magnet according to the present invention.
Figure 5:
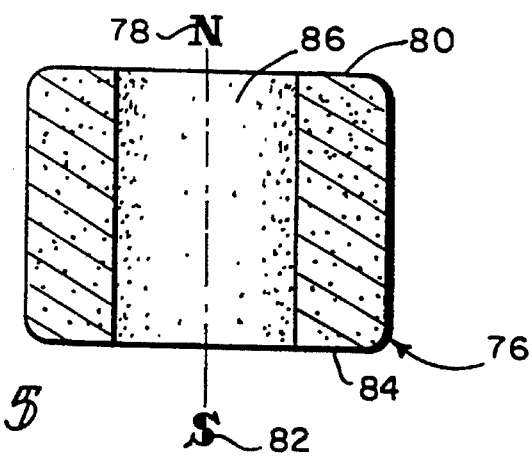
FIG. 5 is a side elevational view taken along line 5—5 of FIG. 4.

Annular permanent magnet 76 is seen in FIGS. 4 and 5. Magnet 76 is shown in FIGS. 4 and 5 as being cylindrical in shape but it is understood that other shapes such as a toroid may be used. Permanent magnet 76 has a north pole 78 on a first end 80, a south pole 82 on an opposite second end 84 thereof and a central bore 86 extending axially therethrough between the opposing ends 80 and 84, so as to be open its entire axial length. Although permanent magnet 76 is shown in FIGS. 4 and 5 as being unitary in construction, it is to be understood that at least one additional method in which it can be formed is from a plurality of segments of magnetized material that are connected together or otherwise associated to form an annular, cylindrical, toroidal or other similar shape.

Figure 7:
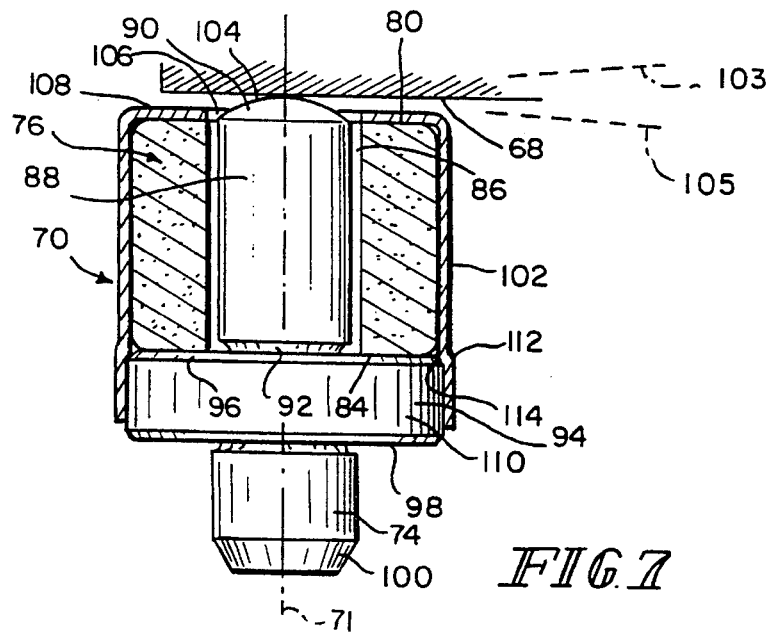
FIG. 7 is a sectional view taken along line 7—7 of FIG. 6.
Figure 6:
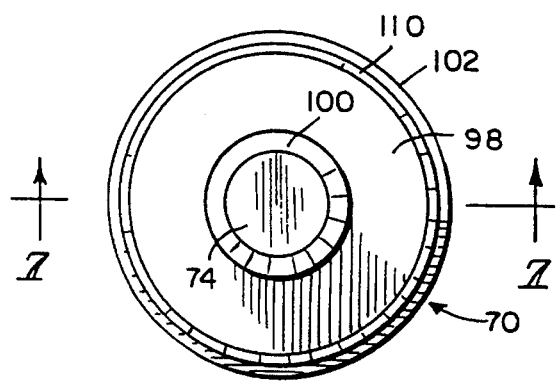
FIG. 6 is a bottom view of FIG. 7.

Magnetic latch assembly 70 according to the present invention is shown in FIGS. 6 and 7. As can be seen, core 88 has first end 90, an annularly shaped flange 94, having a first face 96 and a second face 98, that is fixedly attached, cast, or formed on second end 92 of core 88 so that core 88 substantially orthogonally extends from first face 96 of annularly shaped flange 94. Core 88 is constructed from a ferromagnetic metal such as leaded steel. Chamfered pin 74 is used to attach the magnetic latch assembly 70 to projection 62 of crash stop 58 and is shown substantially orthogonally extending from second face 98 of annular flange 94. A beveled edge 100 is also shown. The beveled edge 100' is used to guide and position pin 74 into an opening (not shown) in projection 62 so that second face 98 of annular flange 94 is flush against projection 62 without any stress fractures occurring therein as a result of such insertion.

The magnetic latch assembly 70 is configured so that the core 88 is axially received in central bore 86 of permanent magnet 76 so that first face 96 of annular flange 94 abuts second end 84 of magnet 76. Core 88 and magnet 76 are disposed and positioned within casing 102, which is a hollow cylindrically-shaped shell having an axial length larger than the axial length of annularly-shaped permanent magnet 76. Casing 102 is formed of a stainless steel which is non-ferromagnetic. Nose 104 is curvilinear in shape, formed on the first end 90 of core 88, and extends through opening 106 formed in partially closed end 108 of casing 102. Casing 102, magnet 76 and core 88 are secured together by a press-fit that exists between casing 102 and the outer periphery 110 of annular flange 94. The press-fit results in an outward radial deformation 112 of inner peripheral surface 114 of casing 102 caused by the abutment of outer periphery 110 of annular flange 94 and inner peripheral surface 114 of casing 102.

Casing 102 "armors" magnet 76, protecting it from contact with other portions of disk drive assembly 26, particularly strike plate 68. This prevents portions of the magnet 76 (which is a relatively brittle metal such as neodymium-iron-boron or a relatively soft compound of metal particles in a polymer binder) from falling off into disk drive assembly 26, particularly disk 28. This press-fit arrangement has the additional advantage of eliminating the use of adhesives to fixedly secure permanent magnet 76 in place. This prevents outgassing problems caused by the use of such adhesives which can damage media and/or components of a disk drive assembly 26.

FIG. 7 shows strike plate 68 in contact with magnetic latch assembly 70 such that the longitudinal axis (not shown) of strike plate 68 is substantially perpendicular to the longitudinal axis 71 of magnetic latch assembly 70. However, the curvilinear shape of nose 104 allows engagement between it and strike plate 68 to occur through a range of relative orientations not possible with conventional multi-point/surface magnetic contact latch assemblies. Lines 103 and 105 diagrammatically illustrate two of the possible orientations of strike plate 68 relative to magnetic latch assembly 70 that will still result in secure latching engagement occurring between the two. A wide range of other orientations that still provide for secure latching engagement are also possible.

Figure 8:
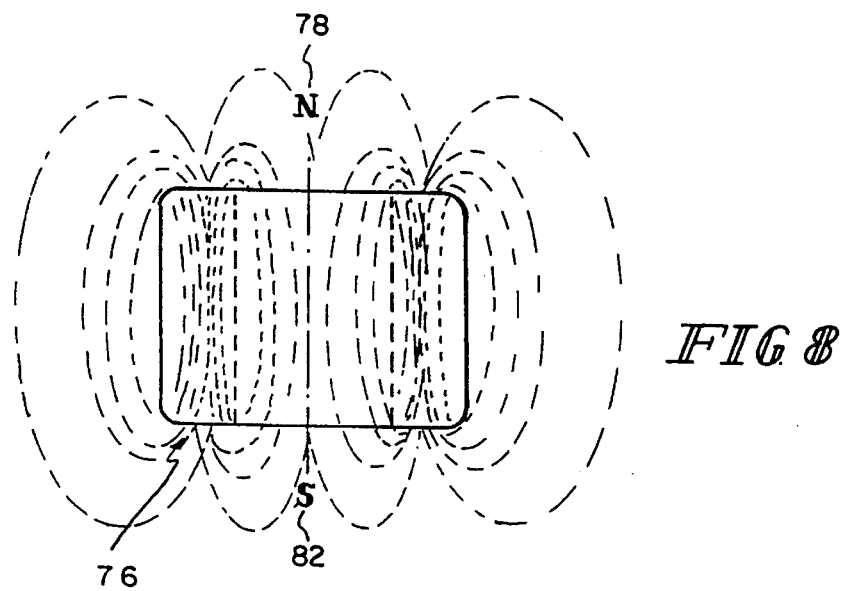
FIG. 8 is a diagrammatic view illustrating magnetic flux lines for the permanent magnet of the present invention.
Figure 9:
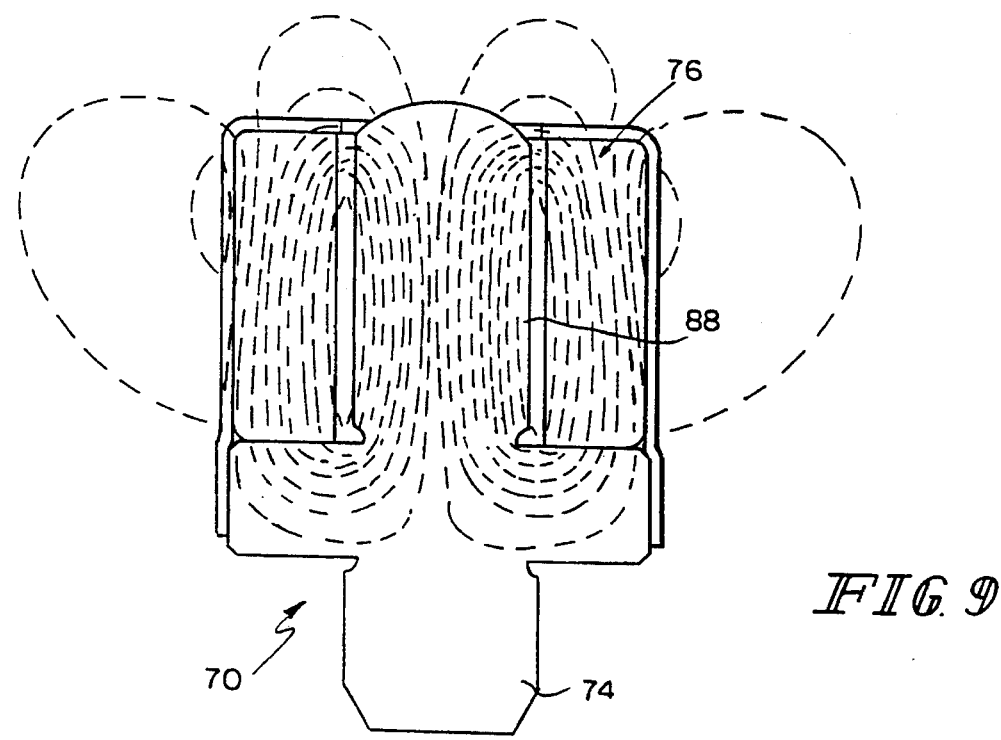
FIG. 9 is a diagrammatic view of the magnetic latch assembly of the present invention with magnetic flux lines shown.

Magnetic field flux lines 116 for permanent magnet 76 are shown in FIG. 8. Flux lines 116 are intended to be compared with magnetic field flux lines 118 of FIG. 9 which shows magnetic latch assembly 70. As can be seen, flux lines 118 for magnetic latch assembly 70 are much "flatter" than those of permanent magnet 76 alone. This "flattening" or concentration results from the fact that the ferromagnetic metal of core 88 of magnetic latch assembly 70 is a superior magnetic flux conductor as compared to the surrounding air. Thus, the magnetic flux field will take a path of least resistance from north pole 78 to south pole 82 through metal core 88. This physically defined flux path is what causes the apparent "flattening" or concentration from 116 to 118 of the magnetic field flux lines.

Figure 10:
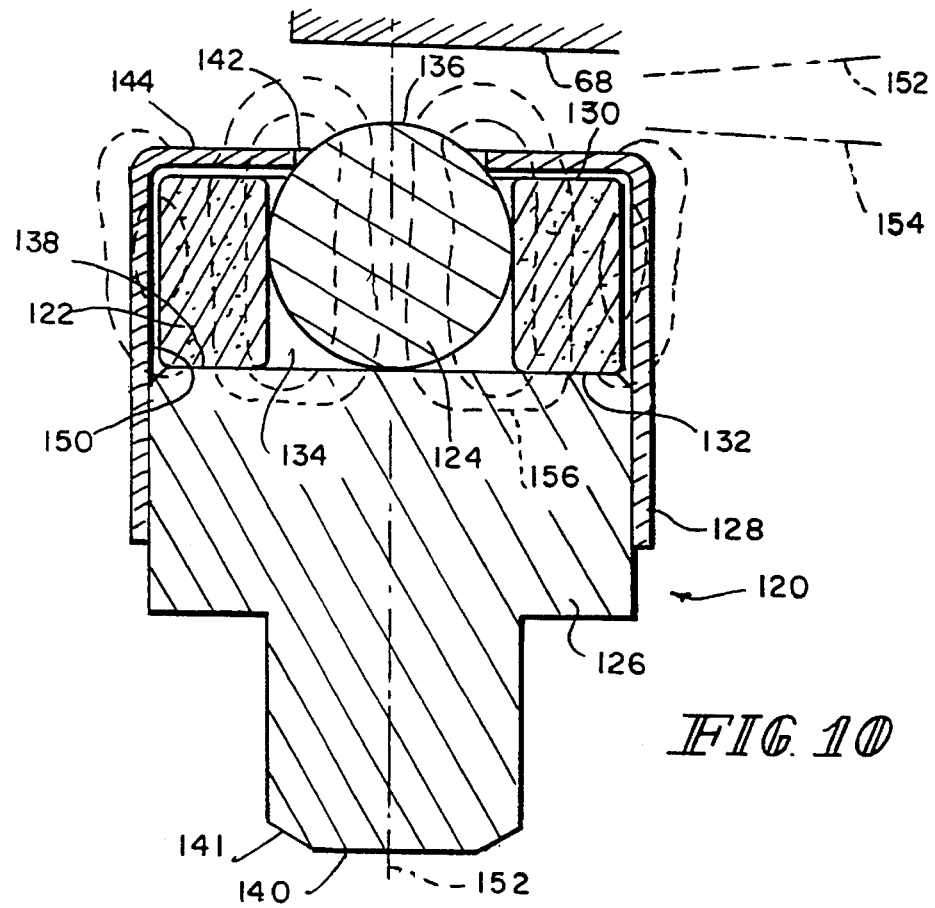
FIG. 10 is a side elevational view of another embodiment of the magnetic latch assembly of the present invention.

FIG. 10 shows another embodiment of a magnetic latch assembly 120 of the present invention. Magnetic latch assembly 120 has an annularly-shaped permanent magnet 122, a core 124, a mounting structure 126, and a casing 128. Permanent magnet 122 has a north pole (not shown) on a first end 130, a south pole (also not shown) on an opposite second end 132 thereof, and a central bore 134 extending axially therethrough between the opposing ends 130 and 132, so that magnet 122 is open its entire axial length. Although magnet 122 is shown in FIG. 10 as being cylindrical in shape, it is to be understood that other shapes such as a toroid may be used. Also, although permanent magnet 122 is shown in FIG. 10 as being unitary in construction, it is to be understood that at least one additional method in which it can be formed is from a plurality of segments of magnetized material that are connected together or otherwise associated to form an annular, cylindrical, toroidal or other similar shape.

Core 124 is a substantially spherically-shaped ball and is disposed within the interior of bore 134 of permanent magnet 122 so that a curvilinear portion 136 extends beyond first end 130 to form a single point of contact with strike plate 68. Core 124 is made from a ferromagnetic material such as chrome steel.

Mounting structure 126 is used to mount magnetic latch assembly 120 to crash stop 58 of disk drive assembly 26. A first end 138 of mounting structure 126 abuts second end 132 of magnet 122. Mounting structure 126 is made from a ferromagnetic material such as a leaded steel alloy and is therefore magnetically attracted to magnet 122. An edge 141 of second end 140 of mounting structure 126 is beveled to facilitate fixedly attaching second end 140 to crash stop 58 of disk drive assembly 26.

Casing 128 is a hollow cylindrically-shaped shell that has an axial length larger than the axial length of magnet 122. Casing 128 is formed of a stainless steel which is a non-ferromagnetic material.

Magnetic latch assembly 120 is configured so that magnet 122, core 124, and at least a portion of mounting structure 126 are disposed within casing 128 so that portion 136 of core 124 extends through opening 142 formed in partially closed end 144 of casing 128. Magnet 122, core 124, and mounting structure 126 are secured together by a press-fit that exists between casing 128 and the outer periphery 146 of mounting structure 126. An air gap 151 lies between magnet 122 and inner peripheral surface 150 of casing 128. Air gap 151 prevents casing 128 from exerting pressure on magnet 122.

Casing 128 "armors" magnet 122, protecting it from contact with other portions of disk drive assembly 26, particularly strike plate 68. This prevents portions of magnet 122 (which is a relatively brittle metal such as neodymium-iron-boron or a relatively soft compound of metal particles in a polymer binder) from falling off into disk drive assembly 26, particularly disk 28. This press-fit arrangement has the additional advantage of eliminating the use of adhesives to fixedly secure permanent magnet 122 in place. This prevents outgassing problems caused by the use of such adhesives which can damage components of disk drive assembly 26.

FIG. 10 shows strike plate 68 in contact with magnetic latch assembly 120 such that the longitudinal axis (not shown) of strike plate 68 is substantially perpendicular to longitudinal axis 152 of magnetic latch assembly 120. However, curvilinear portion 136 also allows engagement between it and strike plate 68 to occur through a range of relative orientations as with magnetic latch assembly 70. Lines 153 and 154 diagrammatically illustrate two of the possible orientations of strike plate 68 relative to magnetic latch assembly 120 that will still result in secure latching engagement occurring between the two. Other orientations that provide for secure latching engagement are also possible.

Magnetic field flux lines 156 for magnetic latch assembly 120 are also shown in FIG. 10. As with magnetic latch assembly 70, magnetic field flux lines 156 are concentrated by core 124 because core 124 is a superior magnetic flux conductor for the magnetic flux of permanent magnet 122 as compared to the surrounding air.

In operation, disk 28 rotates on shaft 30 which is driven by a motor (not shown). Read/write head 36 "flies" over the surface of disk 28 on a cushion of air generated by the rotation of the spinning disk. Read/write head 28 is thus in close proximity with the disk surface. Actuator assembly 38, which includes armature shaft 50, armature 52, coil assembly 54 and casing 56, moves and positions actuator arm 46 on which read/write head 36 is mounted across the surface of disk 28. The movement of actuator arm 46 is limited in both directions by crash stop 58. Upstanding projection 60 limits movement of read/write head 36 beyond outside diameter 42 of disk 28. This limitation of movement occurs as a result of contact between projection 60 and strike plate 68. Projection 62 and magnetic latch assembly 70 limit movement of read/write head 36 beyond inside diameter 40 of disk 28. This limitation of movement occurs as a result of contact between magnetic latch assembly 70 which is connected to projection 62 and strike plate 68. During power-off conditions, magnetic latch assembly 70 also parks read/write head 36 over data-free "landing zone" 44 through magnetic engagement between nose 104 and strike plate 68. This is done to prevent damage to disk 28 or read/write head 36 which may occur during power-off conditions by contact between them due to physical shocks experienced by disk drive assembly 26 during handling and shipping. When power is restored to disk drive assembly 26, actuator assembly 38 has sufficient force to overcome the magnetic attraction between nose 104 and strike plate 68 and break free therefrom to normally position read/write head 36 on disk 28 between the inside and outer diameters 40 and 42.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A disk drive assembly comprising:

a housing;

a data storage device mounted within the housing;

a read/write head assembly for reading information from and writing information to the data storage device;

an actuator assembly for moving the head assembly over the data storage device;

a ferromagnetic strike plate on the actuator assembly;

magnetic means for magnetically engaging the strike plate at a single point of magnetic contact to position the read/write head assembly over a predetermined location on the data storage device when power is off to said data storage device, said magnetic means including a permanent magnet, a casing in which the magnet is positioned to lie, and a ferromagnetic core, said core having a first end adjacent a first magnetic pole of the magnet and a second end adjacent a second magnetic pole of the magnet such that a majority of magnetic flux from the magnet flows through said core; and means for mounting the magnetic means to the housing.

2. The disk drive assembly of claim 1, wherein the permanent magnet has an interior bore extending axially therethrough.

3. The disk drive assembly of claim 2, wherein an annularly-shaped flange is integrally formed on the second end so that said core substantially orthogonally projects from a first face of the annularly-shaped flange, said core being positioned to lie within the interior bore of the permanent magnet so that the first end of said core extends beyond said interior bore.

4. The disk drive assembly of claim 3, wherein the mounting means includes a pin integrally formed on a second face of the annularly-shaped flange.

5. A disk drive assembly, comprising:

a housing;

a data storage device mounted within the housing;

a read/write head assembly for reading information from and writing information to the data storage device;

an actuator assembly for moving the head assembly over the data storage device;

a ferromagnetic strike plate coupled to the actuator assembly;

a magnet;

a core having a curved end, the core being positioned within flux paths of the magnet;

a casing in which the magnet and a portion of the core are positioned to lie so that the curved end of the core engages the strike plate at a single point of magnetic contact to secure the head assembly over a predetermined location on the data storage device during off-power conditions;

means for mounting the core, magnet, and casing to the housing; and a flange integrally formed on the core and positioned to lie within the casing so that portions of the magnet are prevented from falling off into the disk drive, the casing being secured to the flange with a press-fit that is free from adhesives;

wherein the flange includes first and second faces, the core is integrally formed on the first face, and the mounting means includes a pin integrally formed on the second face.

6. A disk drive assembly, comprising:

a housing;

a data storage device mounted within the housing;

a read/write head assembly for reading information from and writing information to the data storage device;

an actuator assembly for moving the head assembly over the data storage device;

a ferromagnetic strike plate coupled to the actuator assembly;

a magnet;

a core having a curved end, the core being positioned within flux paths of the magnet;

a casing in which the magnet and a portion of the core are positioned to lie so that the curved end of the core engages the strike plate at a single point of magnetic contact to secure the head assembly over a predetermined location on the data storage device during off power conditions;

means for mounting the core, magnet, and casing to the housing; and a flange integrally formed on the core and positioned to lie within the casing so that portions of the magnet are prevented from falling off into the disk drive, the casing being secured to the flange with a press-fit that is free from adhesives; and wherein the flange is annular and the casing is a hollow cylindrically-shaped shell having an axial length larger than an axial length of the magnet.

7. A magnetic latch assembly for securing a read/write head of a disk drive during off power conditions, comprising:

a magnet;

a core positioned within flux paths of the magnet and having first and second ends, the first end of the core configured to include a curved portion that contacts a strike plate of the disk drive at a single point of magnetic contact to secure the read/write head during off power conditions;

a casing having an end that is configured to define an opening so that the end of the casing is partially closed, the magnet and core being positioned to lie within the casing so that the curved portion of the first end of the core extends through the opening and beyond the end of the casing; and a flange integrally formed on the second end of the core and positioned to lie within the casing so as to secure the casing to the core;

wherein the flange is annularly shaped and has an outer periphery that is engaged with an inner periphery of the casing so that the casing is secured to the annular flange with a press-fit that is free from adhesives; and further wherein the casing is a hollow cylindrically-shaped shell.

8. A magnetic latch assembly for securing a read/write head of a disk drive during off power conditions, comprising:

a magnet;

a core positioned within flux paths of the magnet and having first and second ends, the first end of the core configured to include a curved portion that contacts a strike plate of the disk drive at a single point of magnetic contact to secure the read/write head during off power conditions; and a casing having an end that is configured to define an opening so that the end of the casing is partially closed, the magnet and core being positioned to lie within the casing so that the curved portion of the first end of the core extends through the opening and beyond the end of the casing;

wherein the magnet is cylindrically-shaped and is configured to include a bore in which the core is positioned to lie.

9. A magnetic latch assembly for securing a read/write head of a disk drive during off power conditions, comprising:

a magnet;

a core positioned within flux paths of the magnet;

a pin for attaching the magnetic latch assembly to the disk drive;

a casing in which the magnet and core are positioned to lie so that the magnet is covered to help prevent portions of the magnet from falling off; and a flange having first and second faces;

wherein the core is integrally formed on the first face of the flange, the pin is integrally formed on the second face of the flange, and the casing engages the flange to secure the magnetic latch assembly together with a press-fit that is free from adhesives.

* * * * *